United States Patent
Oz et al.

(10) Patent No.: US 7,073,053 B1
(45) Date of Patent: Jul. 4, 2006

(54) METHOD AND APPARATUS FOR A BOOT PROGRESSION SCHEME FOR RELIABLY INITIALIZING A SYSTEM

(75) Inventors: Doron Oz, Even-Yehuda (IL); Eldad Bar-Eli, Ramat-Hasharon (IL); Rami Tamir, Ramat-Gan (IL)

(73) Assignee: Cisco Technology, Inc., San Jose, CA (US)

( * ) Notice: Subject to any disclaimer, the term of this patent is extended or adjusted under 35 U.S.C. 154(b) by 567 days.

(21) Appl. No.: 09/976,222

(22) Filed: Oct. 11, 2001

(51) Int. Cl.
*G06F 9/24* (2006.01)
*G06F 15/177* (2006.01)
*G06F 11/00* (2006.01)

(52) U.S. Cl. .................. 713/2; 713/1; 714/36
(58) Field of Classification Search .............. 713/1, 713/2, 100; 711/170; 714/36
See application file for complete search history.

(56) References Cited

U.S. PATENT DOCUMENTS

| | | | |
|---|---|---|---|
| 5,793,943 A * | 8/1998 | Noll .............................. | 714/6 |
| 5,887,163 A | 3/1999 | Nguyen et al. | |
| 5,974,546 A * | 10/1999 | Anderson ...................... | 713/2 |
| 6,292,890 B1 | 9/2001 | Crisan | |
| 6,317,827 B1 * | 11/2001 | Cooper .......................... | 713/2 |
| 6,345,294 B1 | 2/2002 | O'Toole et al. | |
| 6,446,203 B1 * | 9/2002 | Aguilar et al. .................. | 713/2 |
| 6,529,966 B1 * | 3/2003 | Willman et al. ............... | 710/10 |
| 6,643,781 B1 * | 11/2003 | Merriam ....................... | 713/201 |
| 6,757,838 B1 * | 6/2004 | Chaiken et al. ................ | 714/5 |
| 6,826,710 B1 * | 11/2004 | Merkin et al. ................. | 714/6 |

OTHER PUBLICATIONS

Kruse Robert L., Data Structures and Program Design in C++, 1999, Prentice Hall Inc., pp. 50-54.*
Giga-Byte, BX2000+ User's Manual, Dec. 20, 1999, pp. 42-49.*

* cited by examiner

*Primary Examiner*—Chun Cao
*Assistant Examiner*—Mark Connolly
(74) *Attorney, Agent, or Firm*—The Law Office of Kirk D. Williams

(57) ABSTRACT

Methods and apparatus are disclosed for a boot progression scheme for reliably initializing a system. A boot progression data structure is maintained to indicate which of multiple boot images should be initially loaded upon startup of the system. During a boot phase, the boot progression data structure (e.g., a stack or other data structure) is modified to indicate a next boot image to use upon a next startup of the system. If the boot image provides a functional system, then the boot progression data structure is updated to once again indicate to boot with this image, and possibly removing references to other boot images. Otherwise, a reset or restart operation is performed to boot using another image. In this manner, a remote system can be upgraded across a network, and should the upgrade not perform correctly, the system reverts to a previous boot image.

10 Claims, 6 Drawing Sheets

US 7,073,053 B1

METHOD AND APPARATUS FOR A BOOT PROGRESSION SCHEME FOR RELIABLY INITIALIZING A SYSTEM

FIELD OF THE INVENTION

This invention especially relates to system initialization procedures of communications and computer systems; and more particularly, the invention relates to a boot progression scheme for reliably initializing a system.

BACKGROUND OF THE INVENTION

CPU based appliances, such as routers, are usually remotely software-upgradeable with the software image residing in some form of non-volatile memory, such as flash memory. Updating the software image involves downloading a new image to the appliance and replacing the existing image with the new image.

To overcome a problem of a power failure or other failure during the downloading or flash update process, a double-image approach may be used. However, if the loaded image cannot successfully load or connect to other systems (e.g., a management system), for any reason (e.g., hardware incompatibility, network incompatibility, defective image), it is necessary to manually access the appliance and reload a workable image or downgrade the software. However, such an upgrade scheme is problematic especially in installations where there are numerous such appliances or the upgrade process is done remotely. New systems and methods are required for initializing and updating the boot images of systems.

SUMMARY OF THE INVENTION

Systems and methods are disclosed for a boot progression scheme for reliably initializing a system. In one embodiment, a boot progression data structure is modified to indicate a boot order including to use a second boot image before a first boot image. The system is booted using the second boot image. In one embodiment, a state of the system booted with the second boot image is identified and in response, system is rebooted using the first boot image. In one embodiment, a state of the system booted with the second boot image is identified and in response, the boot progression data structure is updated to indicate to boot next time with the second boot image. In one embodiment, the boot progression data structure includes a stack.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
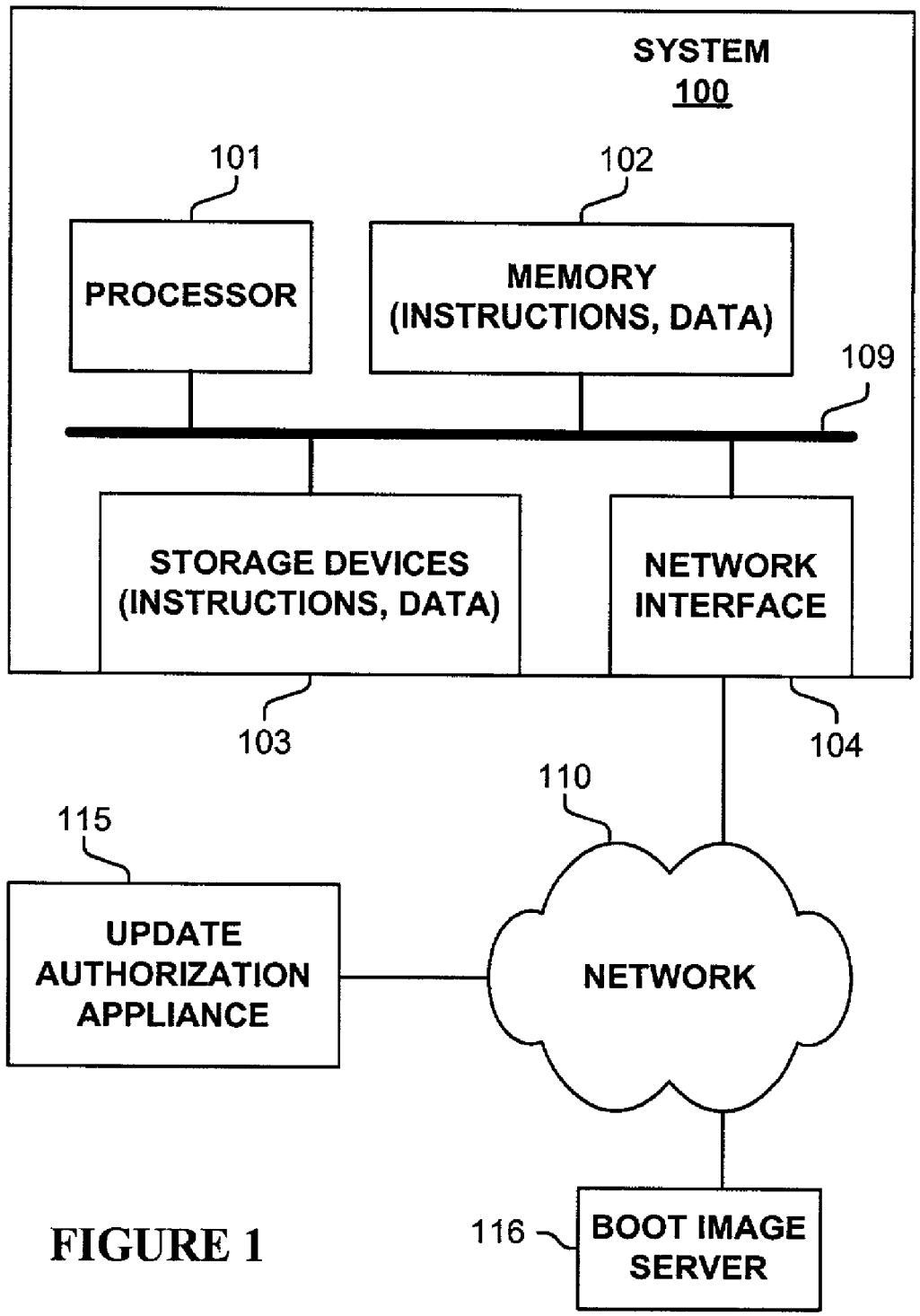
FIG. 1 is a block diagram of an embodiment for a boot progression scheme for reliably initializing a system.

Methods and apparatus are disclosed for a boot progression scheme for reliably initializing a system. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps and processing of signals and information illustrated in the figures are typically be performed in a different serial or parallel ordering and/or by different components in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. Moreover, the term "or" is used herein to identify an alternative selection of one or more, including all, of the conjunctive items.

Methods and apparatus are disclosed for a boot progression scheme for reliably initializing a system. A boot progression data structure is maintained to indicate which of multiple boot images should be initially loaded upon startup of the system. During a boot phase, the boot progression data structure (e.g., a stack or other data structure) is modified to indicate a next boot image to use upon a next startup of the system. If the boot image provides a functional system, then the boot progression data structure is updated to once again indicate to boot with this image, and possibly removing references to other boot images. Otherwise, a reset or restart operation is performed to boot using another image. In this manner, a remote system can be upgraded across a network, and should the upgrade not perform correctly, the system reverts to a previous boot image.

In one embodiment including a networked system, the flash memory is divided into two or more partitions to accommodate multiple software images ("partition 0..n"). In addition, a space will be reserved to hold a stack of partition numbers for the boot loader containing from which partitions to load the software image, and possibly other boot instructions.

Upon boot, the boot-loader will examine the progressive boot data structure in the form of a stack, and will pop the last entry in the stack and load the image appropriately. The first ("bottom", oldest) entry in the stack cannot be popped. Upon completing the process of downloading via a network, peripheral device or other mechanism, a new software image is copied into a partition and the partition number will be pushed into the stack, and therefore, this new software image will be run upon the next reset. In one embodiment, the software image that is loaded will be responsible to decide whether it has sufficient control of the system (e.g., a positive connection to a management station has been established) and updating of the partition stack in accordance. In one embodiment, the system uses watchdog timers and/or other mechanisms to verify the integrity of the boot image, and if a problem is detected, a reset operation is performed to boot the system with a previous version. In case the new software version is damaged or does not load for any reason, the system will reset without updating the stack and the previous version will be loaded.

Optionally, additional parameters may be passed to the software version through the same stack to enable other features, such as one-time (or some other predetermined number of times) software testing with automatic downgrade in any case (e.g., a flag that will instruct the version not to re-write the partition stack), etc.

In this manner, certain embodiments may be upgraded and/or tested, and should the new boot image not produce a functional system, the system will automatically revert to a previously working image without physical intervention which could be especially difficult and costly for remote systems. In addition, multiple boot images representing different software versions and/or configurations could be preloaded into a system, with the system progressively sequencing through these multiple boot images until a working system is produced.

FIG. 1 illustrates one embodiment of a system including a boot progression scheme for reliably initializing a system. System 100 may be part of a router or other communications or computer system or any other device. In one embodiment, system 100 includes a processor 101, memory 102, storage devices 103, and a network interface 104, which are electrically coupled via one or more communications mechanisms 109 (shown as a bus for illustrative purposes). Various embodiments of system 100 may include more or less elements. In one embodiment, system 100 receives a new boot image from boot image server 116 via a file transfer or another download process. System 100 updates a boot progression data structure stored in a nonvolatile storage location in memory 102 or storage devices 103. During initialization, system 100 loads this boot image and should it operate properly, then the boot progression data structure is updated so that this image is used during future system initializations. In one embodiment, whether system 100 can communicate with update authorization appliance 115 is included in the determination of whether system 100 is operating properly. Also, in one embodiment, system 100 is initialized via a bootp or other process which receives its image across network 110, and which boot image is used or requested is either managed by system 100 or by boot image server 116. In one embodiment, network 110 may represent a local or internal connection (e.g., cable, bus) to system 100, and boot image server 116 and/or update authorization appliance 115 are external or internal to system 100. In one embodiment, boot image server 116 and update authorization appliance 115 are located within a single system or process.

The operation of system 100 is typically controlled by processor 101 using memory 102 and storage devices 103 to perform one or more tasks or processes. Memory 102 is one type of computer-readable medium, and typically comprises random access memory (RAM), read only memory (ROM), flash memory, integrated circuits, and/or other memory components. Memory 102 typically stores computer-executable instructions to be executed by processor 101 and/or data which is manipulated by processor 101 for implementing functionality in accordance with the invention. Storage devices 103 are another type of computer-readable medium, and typically comprise solid state storage media, disk drives, diskettes, networked services, tape drives, and other storage devices. Storage devices 103 typically store computer-executable instructions to be executed by processor 101 and/or data which is manipulated by processor 101 for implementing functionality in accordance with the invention.

As used herein and contemplated by the invention, computer-readable medium is not limited to memory and storage devices; rather computer-readable medium is an extensible term including other storage mechanisms.

Figure 2:
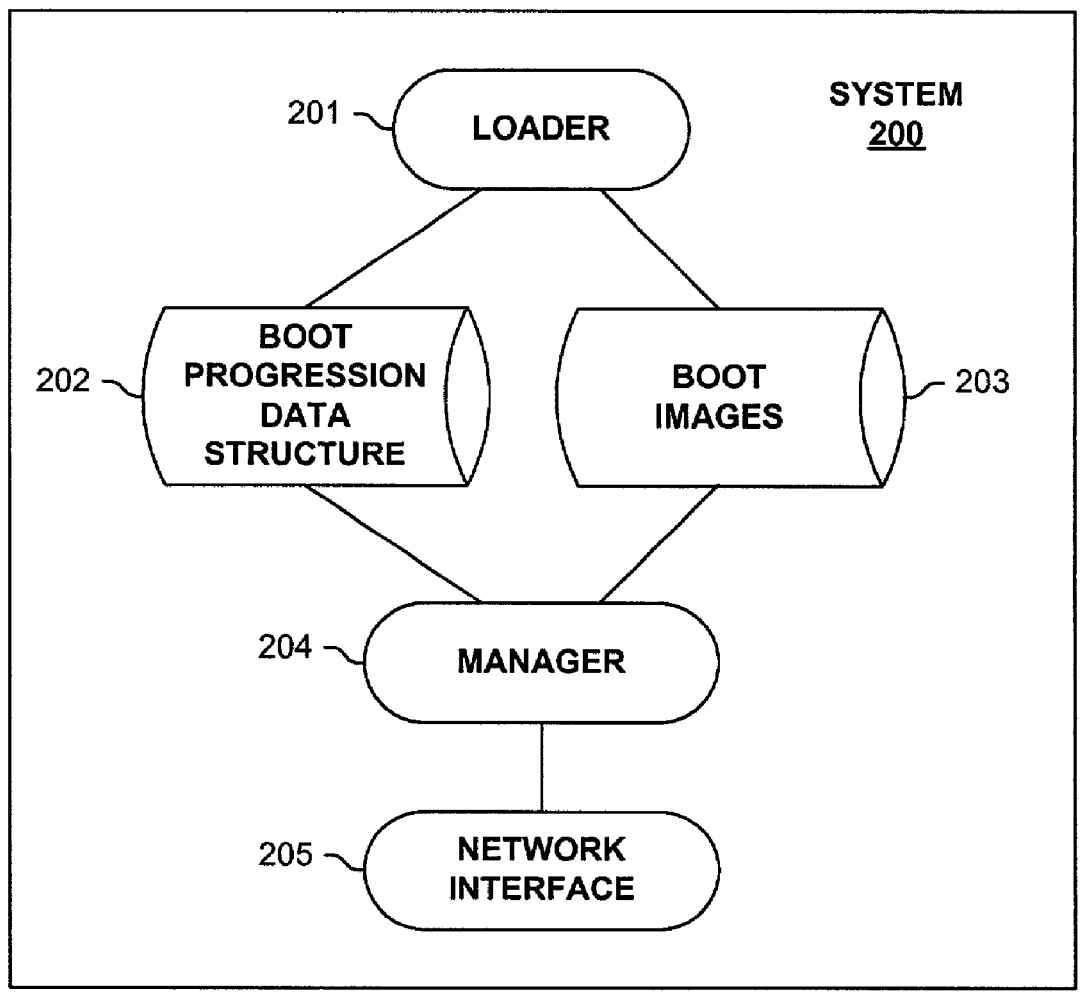
FIG. 2 is a block diagram illustrating a few of processes and maintained data structures and boot images in one embodiment.

FIG. 2 illustrates one embodiment of a system 200 including a loader process 201, a boot progression data structure 202, one or more boot images 203, a manager 204 and a network interface process 205. The operation of these elements in one embodiment are further described in relation to FIGS. 3–5.

Figure 3:
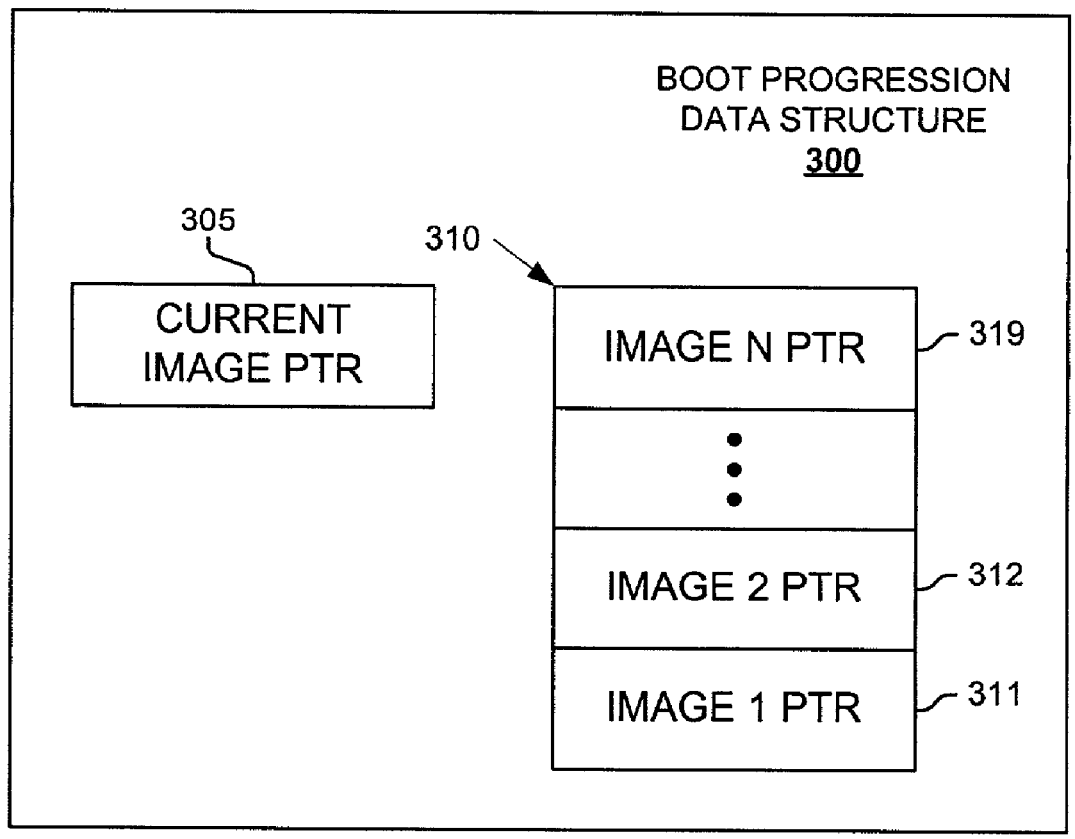
FIG. 3 is a block diagram of an exemplary boot progression data structure.

One embodiment of boot progression data structure 202 is in the form of a stack, such as that illustrated by boot progression data structure 300 illustrated in FIG. 3. As shown, stack 310 includes one or more image pointers 311–319 which provide an address or other indication for loader 201 to locate a particular boot image. Current image pointer 305 (e.g., top of stack pointer) maintains an indication of which image pointer 311–319 should be used during a next boot operation.

As would be apparent to one skilled in the art, embodiments include a boot progression data structures implemented in an unlimited number of ways, such as, but not limited to a stack, pointers, arrays, ordered sets, linked lists, trees, or using any other techniques, mechanisms and data structures. For example, in one embodiment, a boot progression data structure is implemented without using pointers. Additionally, a boot progression data structure 202 (FIG. 2) may be simply a current boot image pointer that is updated in a progression indicated by an ordered set of boot images maintained in any manner, locally or remotely.

Figure 4:
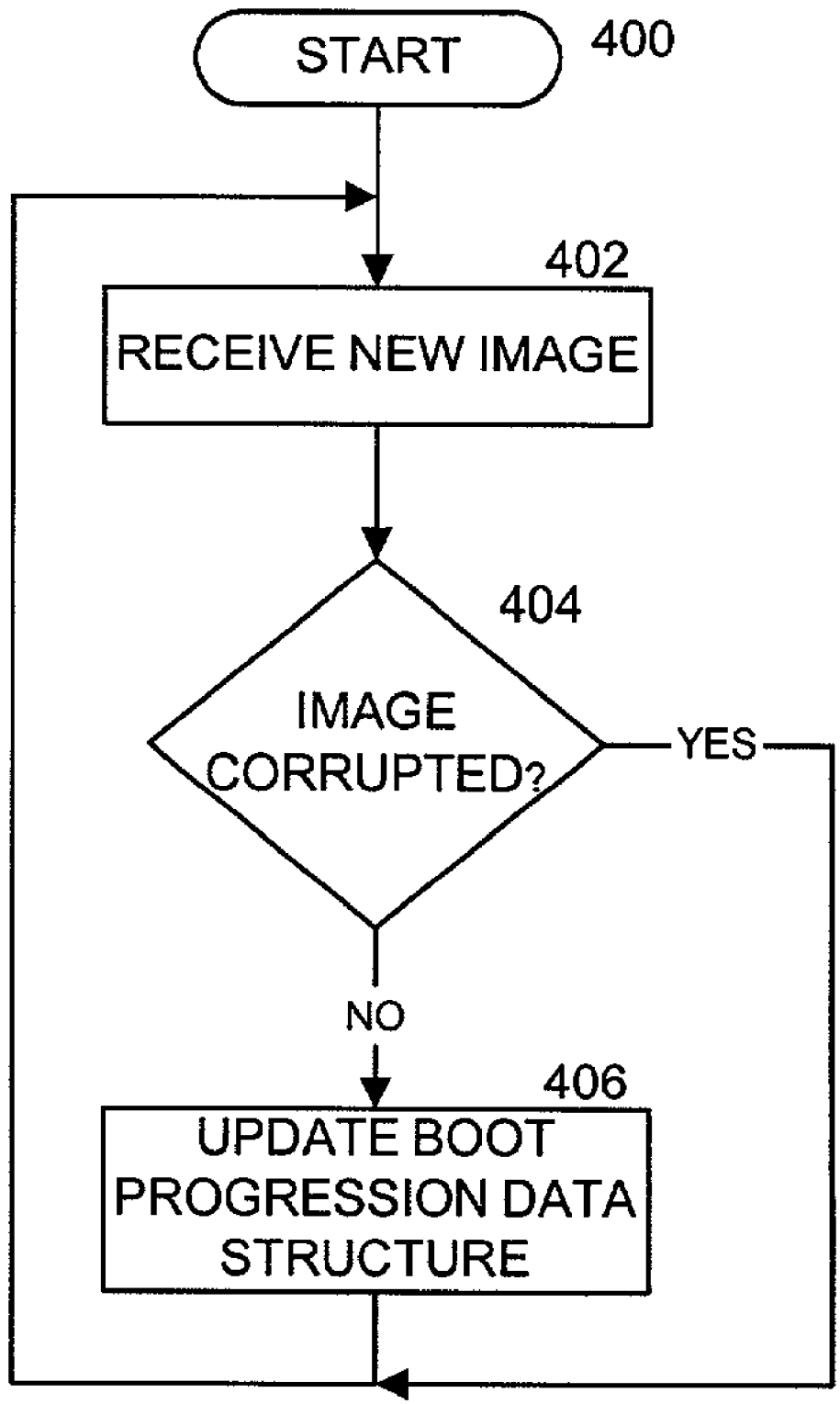
FIG. 4 is a flow diagram of an exemplary process for receiving a new boot image and for initializing the boot progression data structure.

One embodiment of manager 204 (FIG. 2) is illustrated in the flow diagram of FIG. 4. Processing begins with process block 400, and proceeds to process block 402 wherein a new image is received, such as via network interface 205 (FIG. 2). Next, as determined in process block 404, if the image is corrupted, processing returns to process block 402 to receive a next image. Otherwise, in process block 406, the boot progression data structure (e.g., boot progression data structure 202 shown in FIG. 2, boot progression data structure 300 shown in FIG. 3) is updated to reflect the newly received image. Processing returns to process block 402 to receive a next image.

Figure 5A:
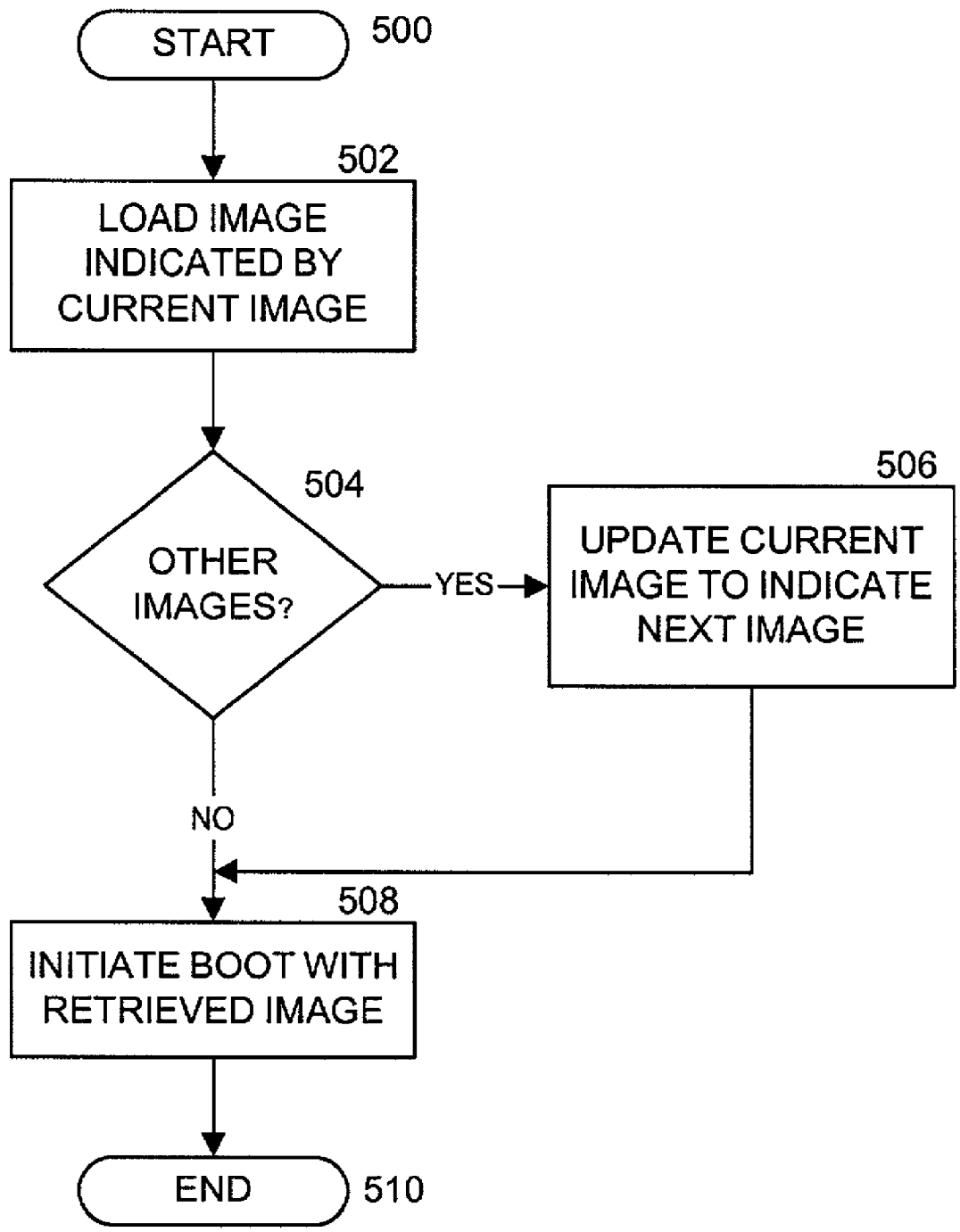
FIGS. 5A–B are flow diagrams of exemplary processes used in one embodiment for implementing a boot progression scheme.
Figure 5B:
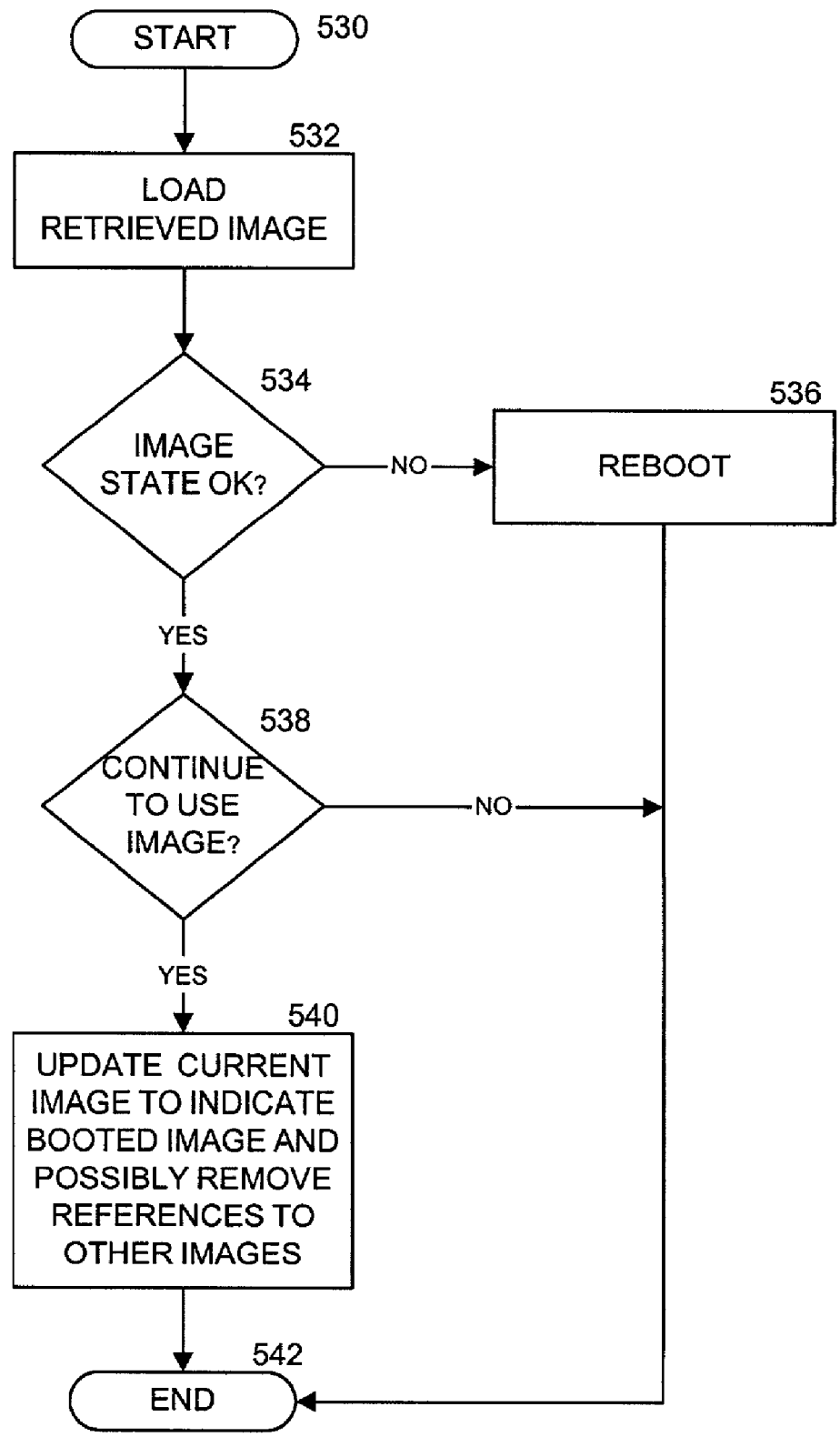

Exemplary processes performed upon initialization in one embodiment, such as by system 100 (FIG. 1) and/or loader 201 of system 200 (FIG. 2) are illustrated in FIGS. 5A–B. Processing begins with process block 500, and proceeds to process block 502, wherein the boot image referenced by a current image indicator is retrieved and loaded in to memory. For example, in one embodiment using the boot progression data structure 300 illustrated in FIG. 3, the particular boot image retrieved is the one indicated by the particular image pointer 311–319 indicated by current image pointer 305.

Next, as determined in process block 504, if there are other images in the boot progression data structure (e.g., the stack originally had more one entry, the ordered list of the image progression is not empty, etc.), then, in process block 506, the current image indicator is updated to indicate the next boot image. In this manner, if the system is unable to boot using the current image, the next image will be used. The boot of the system is initiated in process block 508 (e.g., the process illustrated in FIG. 5B is executed.) Processing is complete as indicated by process block 510.

FIG. 5B illustrates a process for booting the system in one embodiment. Processing begins with process block 530, and proceeds to process block 532, wherein the system is booted with the retrieved image, such as that loaded in process block 502 (FIG. 5A). Next, as determined in process block 534, if the state of the system initialized with the boot image is not ok, then the system is rebooted in process block 536 (i.e., the process illustrated by flow diagram illustrated in FIG. 5A is caused to run again to load the next boot image.) Otherwise, a successful boot was performed and the image is functioning properly (e.g., communicates with a predetermined network appliance or otherwise determined based on any other mechanism or criteria). As determined in process block 538, if the currently booted image is continued to be used (e.g., it is not a one time test image indicated by a flag or other mechanism), then in process block 540, the current image indicator (e.g., boot progression data structure in one embodiment) is updated so that during a next boot, the successfully booted image will be used. Moreover, in one embodiment, the boot progression data structure is updated to remove references to other boot images. Processing is complete as indicated by process block 542.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by a system, the method comprising:

loading a second boot image based on a current boot image identifying the second boot image, and updating the current boot image to identify a first boot image;

after said loading and updating operations, booting using the second boot image loaded during said loading operation; and in response to identifying that a state of the system booted with the second boot image by said booting operation is not ok, loading and booting the system using the first boot image based on the current boot image identifying the first boot image.

2. A computer-readable medium containing computer-executable instructions for performing operations, said operations comprising:

loading a second boot image based on a current boot image identifying the second boot image, and updating the current boot image to identify a first boot image;

after said loading and updating operations, booting using the second boot image loaded during said loading operation; and in response to identifying that a state of the system booted with the second boot image by said booting operation is not ok, loading and booting the system using the first boot image based on the current boot image identifying the first boot image.

3. A method performed by a system, the method comprising:

loading a second boot image based on a boot order identified by a boot progression data structure, the boot progressing data structure including a plurality of indications, at least one of the plurality of indications identifying the second boot image and at least a second one of the plurality of indications identifying a first boot image, and updating the boot progression data structure to indicate a new boot order including to boot next using the first boot image;

after said loading and updating operations, booting using the second boot image loaded during said loading operation; and in response to identifying that a state of the system booted with the second boot image by said booting operation is not ok, loading and booting the system using the first boot image based on the new boot order identifying to boot next using the first boot image.

4. The method of claim 3, wherein the boot progression data structure includes a stack including the plurality of indications and for identifying said boot orders.

5. A computer-readable medium containing computer-executable instructions for performing operations, said operations comprising:

loading a second boot image based on a boot order identified by a boot profession data structure, the boot progressing data structure including a plurality of indications, at least one of the plurality of indications identifying the second boot image and at least a second one of the plurality of indications identifying a first boot image, and updating the boot progression data structure to indicate a new boot order including to boot next using the first boot image;

after said loading and updating operations, booting using the second boot image loaded during said loading operation; and in response to identifying that a state of the system booted with the second boot image by said booting operation is not ok, loading and booting the system using the first boot image based on the new boot order identifying to boot next using the first boot image.

6. An apparatus comprising:

means for loading a second boot image based on a boot order identified by a boot progression data structure, the boot progression data structure including a plurality of indications, at least one of the plurality of indications identifying the second boot image and at least a second one of the plurality of indications identifying a first boot image;

means for updating the boot order identified by the boot progression data structure; and means for booting using the second boot image;

wherein said means for updating the boot order includes means for determining whether to load and boot next time with the second boot image or whether to load and boot next time with the next boot image specified by the boot order based on a value of a boot times indicator identifying a number of times to load and boot using the second boot image; wherein the first and second boot images are operable images.

7. A system comprising:

a boot progression data structure indicating an ordering of a plurality of boot images, wherein the boot progression data structure includes a plurality of indications of boot images; and a loader responsive to the boot progression data structure; wherein the loader loads a first boot image identified by the ordering of the plurality of boot images and updates the boot progression data structure to identify a next boot image in the ordering of the plurality of boot images, and then boots the system with said loaded first boot image.

8. The system of claim 7, wherein in response to said booting the system with the loaded first boot image resulting in the system operating in an active state, the boot progression data structure is updated to identify the first boot image to use during a next boot phase.

9. The system of claim 7, wherein in response to the system operating in an active state when booted with the first boot image, the boot progression data structure is updated to reflect only the first boot image.

10. An apparatus comprising:

means for loading a second boot image based on a current boot image identifying the second boot image, and updating the current boot image to identify a first boot image;

means for booting, after said loading and updating operations, using the second boot image loaded during said loading operation; and means for, in response to identifying that a state of the system booted with the second boot image by said booting operation is not ok, loading and booting the system using the first boot image based on the current boot image identifying the first boot image.

* * * * *

UNITED STATES PATENT AND TRADEMARK OFFICE
CERTIFICATE OF CORRECTION

PATENT NO.        : 7,073,053 B1
APPLICATION NO.   : 09/976222
DATED             : July 4, 2006
INVENTOR(S)       : Oz et al.

It is certified that error appears in the above-identified patent and that said Letters Patent is hereby corrected as shown below:

Col. 7, line 5, replace "profession" with -- progression --

Signed and Sealed this

Twenty-eighth Day of November, 2006

JON W. DUDAS
*Director of the United States Patent and Trademark Office*